United States Patent
Huang et al.

(10) Patent No.: US 10,528,500 B2
(45) Date of Patent: Jan. 7, 2020

(54) DATA PACKET PROCESSING METHOD

(71) Applicant: REALTEK SEMICONDUCTOR CORP., Hsinchu (TW)

(72) Inventors: Jun-Jiang Huang, Jiangsu (CN); Lu Xiong, Jiangsu (CN); Li He, Jiangsu (CN); Chun-Wei Gu, Jiangsu (CN); Lu Han, Jiangsu (CN); Sung-Kao Liu, Hsinchu (TW); Chun-Hao Lin, New Taipei (TW); Xi-Cheng Shan, Jiangsu (CN); Guan-Yu Liu, Jiangsu (CN)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 16/111,563

(22) Filed: Aug. 24, 2018

(65) Prior Publication Data
US 2019/0370197 A1 Dec. 5, 2019

(30) Foreign Application Priority Data
Jun. 1, 2018 (CN) .......................... 2018 1 0555560

(51) Int. Cl.
| G06F 13/24 | (2006.01) |
| G06F 13/26 | (2006.01) |
| H04L 29/06 | (2006.01) |
| H04L 12/851 | (2013.01) |

(52) U.S. Cl.
CPC .............. G06F 13/24 (2013.01); G06F 13/26 (2013.01); H04L 47/24 (2013.01); H04L 69/16 (2013.01); H04L 69/22 (2013.01); *G06F 2213/2424* (2013.01)

(58) Field of Classification Search
CPC .................................. G06F 13/26; G06F 13/24
See application file for complete search history.

(56) References Cited

U.S. PATENT DOCUMENTS

| 9,680,931 | B1* | 6/2017 | Karnowski | ......... H04L 67/1097 |
| 2007/0271401 | A1* | 11/2007 | Louzoun | ................. G06F 13/26 710/264 |
| 2008/0310609 | A1* | 12/2008 | Brady, Jr. | ............. H04M 9/001 379/167.02 |
| 2016/0380835 | A1* | 12/2016 | Ishizaki | ................ H04L 69/325 370/400 |

* cited by examiner

*Primary Examiner* — Zachary K Huson
(74) *Attorney, Agent, or Firm* — Li & Cai Intellectual Property (USA) Office

(57) ABSTRACT

A data packet processing method comprises: receiving data packet including a key message; analyzing the key message; determining whether the data packet is a high priority data packet or a normal data packet according to a result of analyzing the first key message of the data packet; and executing an Rx high priority interrupt in response to determining that the data packet is the high priority data packet. The Rx high priority interrupt is to immediately transmit an interrupt signal to interrupt receiving of the data packets.

8 Claims, 3 Drawing Sheets

DATA PACKET PROCESSING METHOD

CROSS-REFERENCE TO RELATED APPLICATIONS

This application claims priority to Chinese Patent Application No. CN 201810555560.1, filed on Jun. 1, 2018.

1. Field of the Invention

The present disclosure relates to a data processing method; more particularly, to a data processing method applied for data packets classified as different priorities.

2. Description of Related Art

System on Chip (SoC) is an integrated circuit (also known as an "IC" or "chip") that integrates all components of a computer or other electronic systems and that is widely used by chip designers. These components typically include a central processing unit (CPU), subsystems and subsystems of subsystems all on a single substrate. Those subsystems communicate with each other for data packet exchange through a system bus. A system bus is a single computer bus that connects the major components of a computer system, combining the functions of a data bus to carry information, an address bus to determine where the information should be sent, and a control bus to determine operation of the information.

Conventionally, the subsystems of the SoC communicate with one another to control access of the data packet by usage of trigger interrupt mechanism. The interrupt mechanism is operated by an interrupt controller of the CPU. The interrupt controller is configured to connect electrically the CPU and each of the subsystems. When one of the subsystems is interrupted, signal (e.g., data packets) already received by the interrupt controller can be retransmitted to arrive the CPU.

However, since the amount of the data packets transmitted on the network is tremendously huge, CPU usage rate would be too high if each piece of the data packets is sent to the CPU for individual processing, which incurs high occupation of the system resource and thereby reducing usage efficiency of the hardware. One of the most commonly-using means to prevent the abovementioned situation from happening is to apply an interrupt moderation method which significantly reduces the number of interrupts. Specifically, the interrupt moderation forbids the interrupt controller from generating an interrupt immediately after a packet is received. Instead, the interrupt controller waits for more packets to arrive, or for a time-out to expire, before generating an interrupt. The interrupt controller specifies the maximum number of packets, time-out interval, or other interrupt moderation algorithm. The application of the interrupt moderation method reduces the CPU usage rate and thus enhances hardware efficiency.

Nevertheless, the interrupt moderation method may cause postpone of data packets transmission and delay of the information processing. As a result, for the application that requires timely response on data packets interchange, the interrupt moderation method is unreliable.

SUMMARY OF THE INVENTION

Therefore, an aspect of the present disclosure provides a data packet processing method that is applied in a processor performing data processing operations. The data packet processing method of the present disclosure comprises the following steps of: receiving data packets, each of the data packets includes at least a first key message; analyzing the first key messages of the data packets; determining whether the data packet is a high priority data packet or a normal data packet according to a result of analyzing the first key message of the data packet; executing an Rx high priority interrupt in response to determining that the data packet is the high priority data packet; and executing an interrupt moderation in response to determining that the data packet is the normal data packet, wherein the Rx high priority interrupt is to immediately transmit an interrupt signal to interrupt receiving of the data packets such that currently-received data packets are instantaneously processed, and wherein the interrupt moderation is to continuously receive the data packets until at least one of the situations of a predetermined amount of data packets receiving is reached; and a predetermined time-out interval is passed.

Another aspect of the present disclosure provides a data packet processing method that is applied in the processor performing data processing operations. The data packet processing method of the present disclosure comprises the following steps of: receiving data packets, each of the data packets includes at least a first key message; analyzing the first key messages of the data packets; determining whether the data packet is a high priority source data packet or a normal source data packet according to the result of analyzing the first key message of the data packet; executing the Rx high priority interrupt in response to determining that the data packet is the high priority source data packet; and executing the interrupt moderation in response to determining that the data packet is the normal source data packet.

Yet another aspect of the present disclosure provides a data packet processing method that is applied in the processor performing data processing operations. The data packet processing method of the present disclosure comprises the following steps of: receiving data packets, each of the data packets includes at least a first key message and a second key message; analyzing the first key messages of the data packets; determining whether the data packet is a high priority source data packet or a normal source data packet according to the result of analyzing the first key message of the data packet; executing the Rx high priority interrupt in response to determining that the data packet is the high priority source data packet; analyzing the second key message of the data packet in response to determining that the data packet is the normal source data packet; determining whether the normal source data packet is the high priority data packet or a normal data packet according to a result of analyzing the second key message of the normal source data packet; executing the Rx high priority interrupt in response to determining that the normal source data packet is the high priority data packet; and executing the interrupt moderation in response to determining that the normal source data packet is the normal data packet.

In order to further the understanding of the present disclosure, the following embodiments are provided along with illustrations to facilitate the disclosure of the present disclosure.

DETAILED DESCRIPTION OF THE PREFERRED EMBODIMENTS

The aforementioned illustrations and following detailed description are exemplary for the purpose of further explaining the scope of the present disclosure. Other objectives and advantages related to the present disclosure will be illustrated in the following description and appended drawings.

Figure 1:
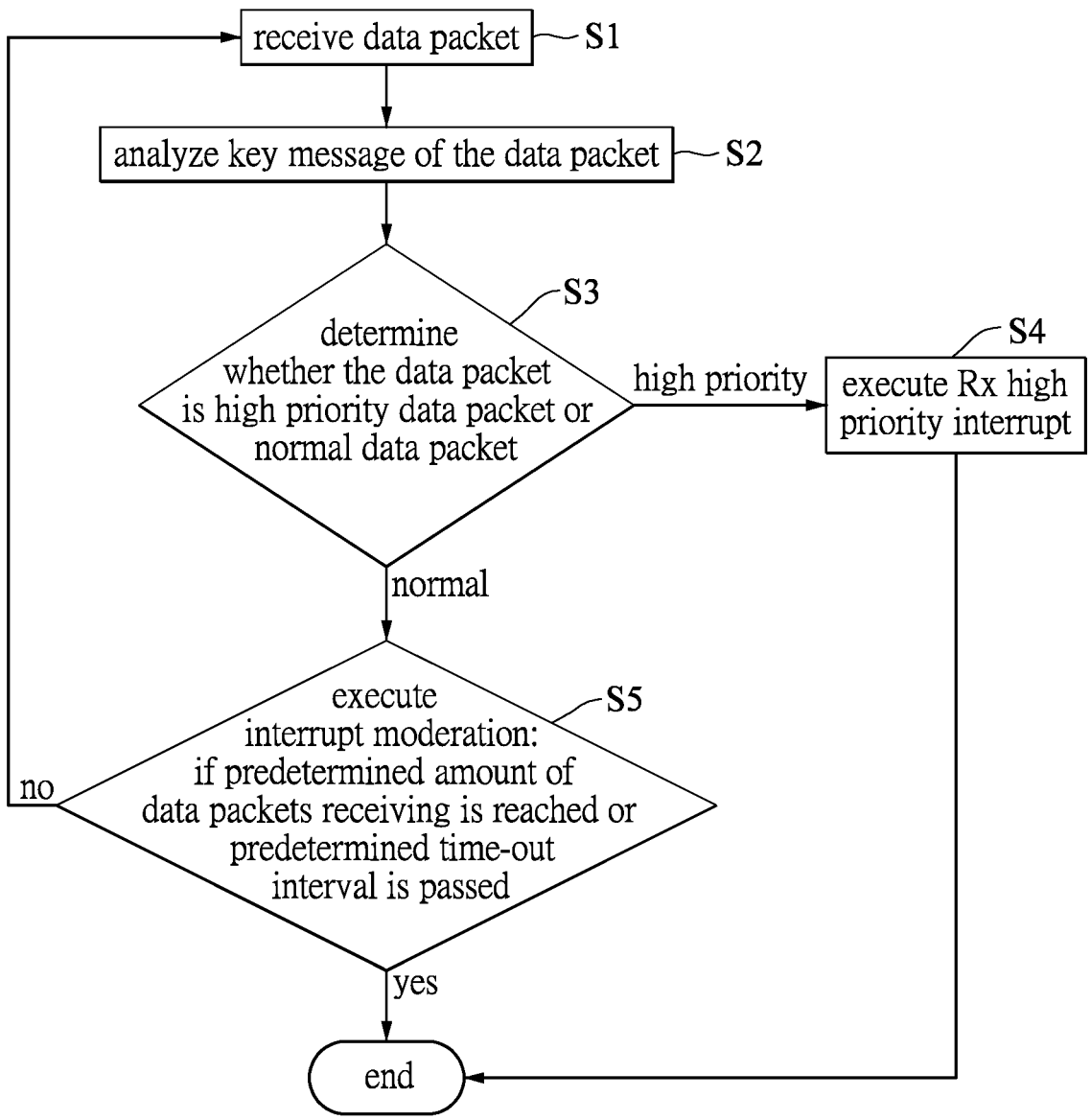
FIG. 1 is a flowchart of a data packet processing method according to the present disclosure for dealing with data packets classified as different priorities.

Referring to FIG. 1, a data packet processing method according to the present application is applied in a processor (not shown) that performs data processing operations. The processor is typically a central processing unit (CPU), but should not be limited thereto. The data packet processing method of the present disclosure comprises the following steps.

Step S1 of the data packet processing method is to receive data packets from subsystems (as senders). Each of the data packets includes at least a key message. The key message indicates at least an attribute or nature of the data packets. The key message may include transmission protocol, source and destination port numbers, an IP address, and/or anything related to seven levels of an Open System Interconnection (OSI) Reference Model. Detailed description of the species of the key message will be further demonstrated as follows.

Step S2 of the data packet processing method is to analyze the key messages of the data packets. The key message of the present application is in a header of the data packet. The header refers to supplemental data placed at the beginning of a block of data being stored or transmitted. In data transmission, the data following the header are sometimes called the payload. The data (payload) are preceded by header information such as the sender's (source) and the recipient's (destination) IP addresses. The header's format is specified in the Internet Protocol.

Step S3 of the data packet processing method is to determine whether the data packet is a high priority data packet or a normal data packet according to a result of analyzing the key message of the data packet. As mentioned above, the header of the data packet generally contains information such as IP addresses of the data packet sender, which is regarded as the key message of the present application. Therefore, by simply analyzing the key message in the header of the data packet, the data packet can be categorized into two groups: high priority data packet and normal data packet. It is understood that the key message is referred to the IP address here, but could also be other information of the data packet in other embodiments of the present application.

Step S4 of the data packet processing method is to execute an Rx high priority interrupt in response to determining that the data packet is the high priority data packet. Specifically, the Rx high priority interrupt is a mechanism, when executed by an interrupt controller (not shown), to immediately transmit an interrupt signal to interrupt receiving of the data packets. Afterwards, the interrupt controller retransmits the currently-received data packets to the processor for instantaneous processing.

Step S5 of the data packet processing method is to execute an interrupt moderation in response to determining that the data packet is the normal data packet. Specifically, the interrupt moderation is to continuously receive the data packets until at least one of the situations of: a predetermined amount of data packets receiving is reached; and a predetermined time-out interval is passed. In other words, since the normal data packets do not require an immediate processing, the interrupt controller keeps receiving the data packets until either the predetermined amount thereof is reached, or the predetermined time-out interval of receiving the data packets is passed, and then retransmits the data packets the received data packets to the processor for processing. It should be understood that, the interrupt moderation is for exemplary purpose only, any alternative means which does not immediately transmit an interrupt signal to interrupt receiving of the data packets can be considered as the interrupt moderation, and thus the scope of the present disclosure should not be limited thereto.

First Embodiment

Figure 2:
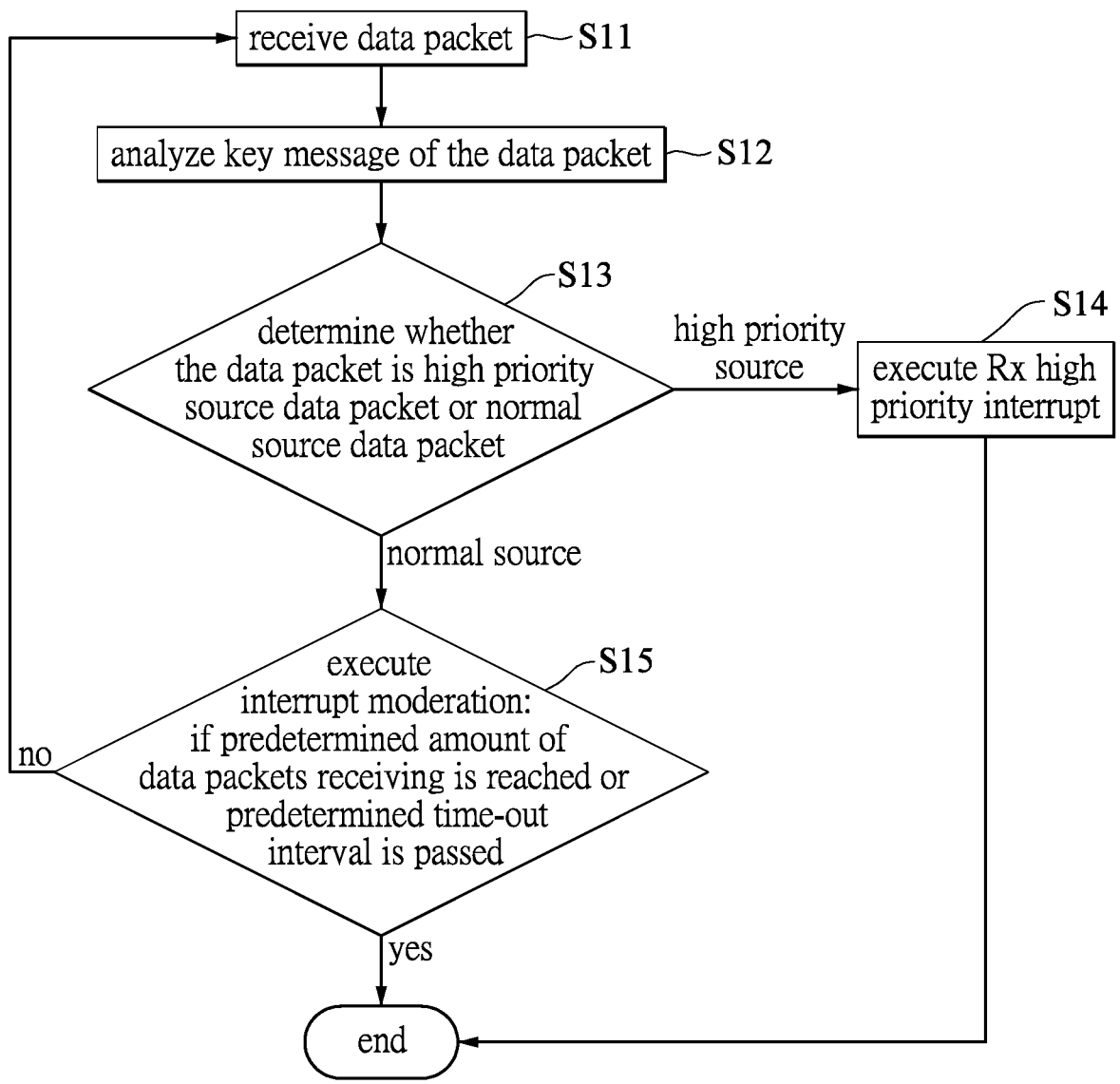
FIG. 2 is a flowchart of a first embodiment of the data packet processing method according to the present disclosure.

Referring to FIG. 2, a flowchart of a first embodiment of the data packet processing method according to the present disclosure is shown to include the following steps.

Step S11 of the data packet processing method is to receive data packets from subsystems (as senders). Each of the data packets includes at least a key message. In this embodiment, the key message indicates the source of the data packet (i.e., where the data packet came from). Specifically, the key message of the data packet at least includes a Transmission Control Protocol (TCP) source port number. TCP is the most commonly used protocol on the Internet and any TCP/IP network. Whereas the IP protocol deals only with packets, the TCP enables two hosts to establish a connection and exchange streams of data. The TCP guarantees delivery of data such that packets will be delivered in the same order in which they were sent. It should be noted that the key message of the data packet may also include a User Datagram Protocol (UDP) source port number, and should not be limited thereto.

The port is typically associated with an IP address of a host and the protocol type of the communication. Ports are identified for each protocol and address combination by 16-bit unsigned numbers, commonly known as the port number. The source port number identifies the sender's port (subsystems in this case). If the source host is a client, the port number is likely to be an ephemeral port number. If the source host is the server, the port number is likely to be a well-known port number. For example, one of the most famous games "World of Warcraft" uses transmission protocol of TCP with a source port number of 3724. Since the abovementioned real-time game needs timely response in data exchanging, the interrupt moderation that causes delay on transmission may be reliable.

By virtue of the data packet processing method of the present application, the source port number of 3724 could soon be recognized, as shown in step S12 (analyzing the key messages of the data packets), and the data packet sent from this particular source (port) can be immediately categorized as high priority source data packet, as shown in step S13 (determining whether the data packet is a high priority source data packet or a normal source data packet). Since the source port number of 3724 is determined to be high priority source data packet, the Rx high priority interrupt is executed, as shown as S14 (executing Rx high priority interrupt in response to determining that the data packet is the high priority source data packet), and thus the data packet is instantaneously transmitted to the processor for processing. Otherwise, as shown in step S15 (executing interrupt moderation in response to determining that the data packet is the normal data packet), the data packets will continuously be received until at least one of the situations of a predetermined amount of data packets receiving is reached; and a predetermined time-out interval is passed.

Second Embodiment

Figure 3:
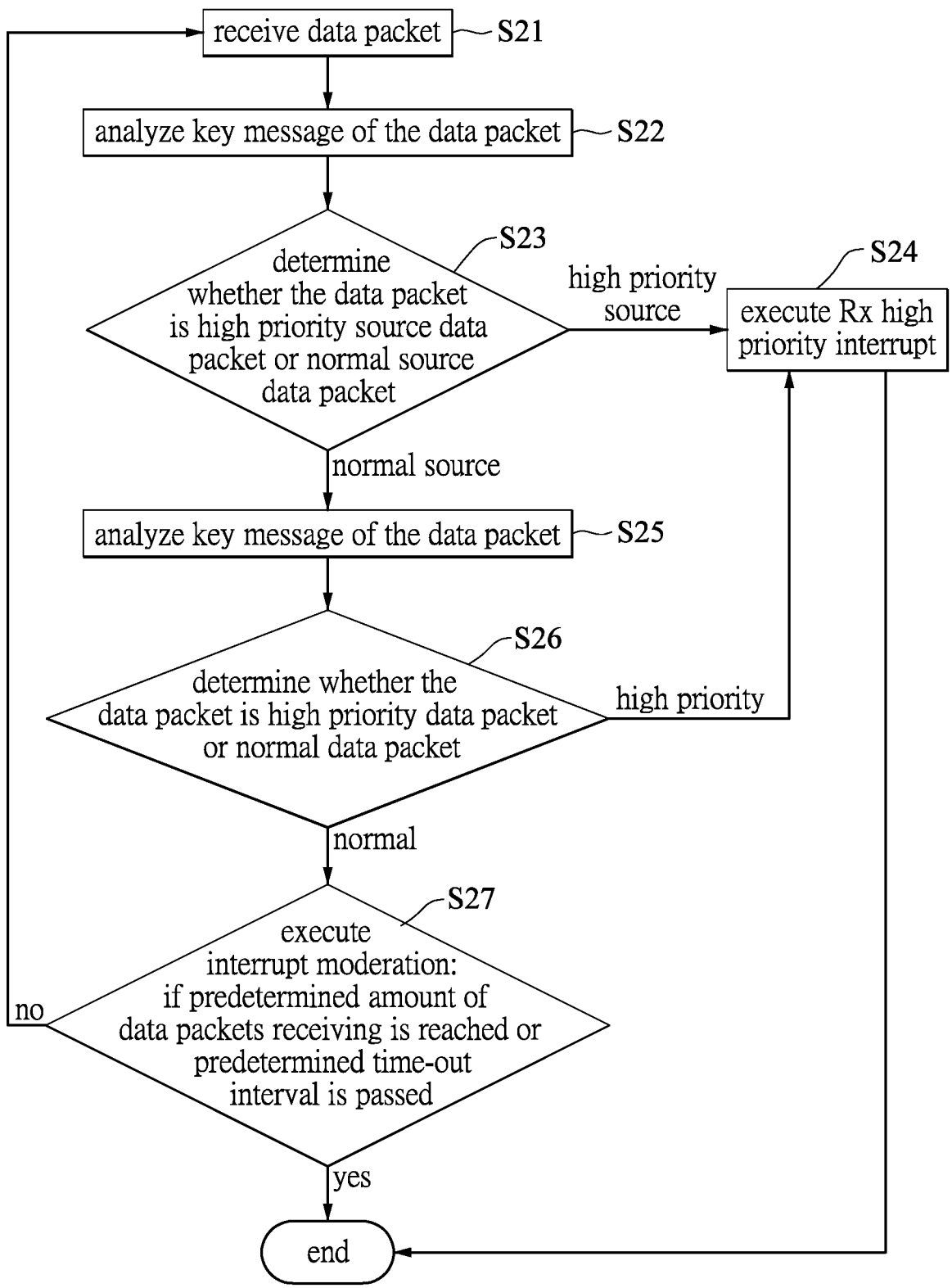
FIG. 3 is a flowchart of a second embodiment of the data packet processing method according to the present disclosure.

Referring to FIG. 3, a flowchart of a second embodiment of the data packet processing method according to the present disclosure is shown to include the following steps.

The difference between the first and second embodiments is that the key message in this embodiment indicates not only the source of the data packet (i.e., where the data packet came from) but also the content of the data packet. It is understood that the content of the data packet may be in the header or a payload of the data packets to include at least one of the transmission protocol, a destination port number, an IP address, and/or anything related to seven levels of the OSI Reference Model as mentioned before. The details description of the content of the data packet is omitted.

Specifically, after the data packet is received (as shown in steps 21) and analyzed (as shown in step S22), it is to be determined that whether the data packet is a high priority source data packet or a normal source data packet according to the result of analyzing the source of the data packet (as shown in step S23). After that, in response to determining that the data packet is the high priority source data packet, the Rx high priority interrupt is executed (as shown in step S24). In response to determining that the data packet is the normal source data packet, the second analyzing is implemented to further analyze the content of the key message of the data packet (as shown in step S25).

Afterwards, it is to be determined that whether the normal source data packet is the high priority data packet or the normal data packet according to a result of analyzing the content of the normal source data packet (S26). In response to determining that the normal source data packet is the high priority data packet, the Rx high priority interrupt is executed (as shown in step S24). On the contrary, in response to determining that the normal source data packet is the normal data packet, the interrupt moderation is executed (as shown in step S27).

By virtue of the data packet processing method of the present disclosure, the data packet can be quickly analyzed, by simply recognizing the source information in the header, and determined to as being transmitted from the high priority source or not. Moreover, the normal source data packet can be further analyzed, by recognizing the content of the data packet, and further determined to be the high priority data packet or not. In response to the above mentioned two-stage analyzing, proper mechanisms of data packet processing can be selectively applied to the data packet. In other words, for the application that requires timely response on data packets interchange, the data packet processing method of the present disclosure provides the Rx high priority interrupt for immediate processing. For the other normal application, the data packet processing method of the present disclosure provides interrupt moderation to enhance hardware efficiency.

The description illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A data packet processing method adapted to be applied in a processor performing data processing operations, the method comprising the following steps of:

receiving data packets, each of the data packets including a first key message that indicates at least source of the data packet and a second key message;

executing a first analyze for analyzing the first key messages of the data packets;

determining whether the data packet is a high priority source data packet or a normal source data packet according to the result of analyzing the source of the data packet;

executing an Rx high priority interrupt in response to determining that the data packet is the high priority source data packet;

executing a second analyze for analyzing the second key message of the data packet in response to determining that the data packet is the normal source data packet;

determining whether the normal source data packet is the high priority data packet or a normal data packet according to a result of analyzing the second key message of the normal source data packet; and executing the Rx high priority interrupt in response to determining that the normal source data packet is the high priority data packet, and thus the data packet is instantaneously transmitted to the processor for processing;

wherein the Rx high priority interrupt is to immediately transmit an interrupt signal to interrupt receiving of the data packets such that currently-received data packets can be instantaneously processed, and wherein the first analyze is different from the second analyze.

2. The data packet processing method according to claim 1, further comprising the step of executing an interrupt moderation in response to determining that the data packet is the normal data packet, wherein the interrupt moderation is to continuously receive the data packets until at least one of the situations of: a predetermined amount of data packets receiving is reached; and a predetermined time-out interval is passed.

3. The data packet processing method according to claim 1, wherein the first key message of the data packet includes at least one of a Transmission Control Protocol (TCP) source port number and a User Datagram Protocol (UDP) source port number.

4. The data packet processing method according to claim 1, wherein the second key message of the data packet includes at least one of a specific transmission protocol, a destination port number, and an IP address.

5. The data packet processing method according to claim 1, wherein the second key message is in a header of the data packets.

6. The data packet processing method according to claim 1, wherein the second key message is in a payload of the data packets.

7. The data packet processing method according to claim 1, wherein the first key message is in a header of the data packet.

8. The data packet processing method according to claim 1, wherein the data packet is under TCP/IP Protocol.

* * * * *